May 20, 1947. G. W. TORRENCE 2,420,762
MEANS FOR ADDING VALUES
Filed July 1, 1944  2 Sheets-Sheet 1
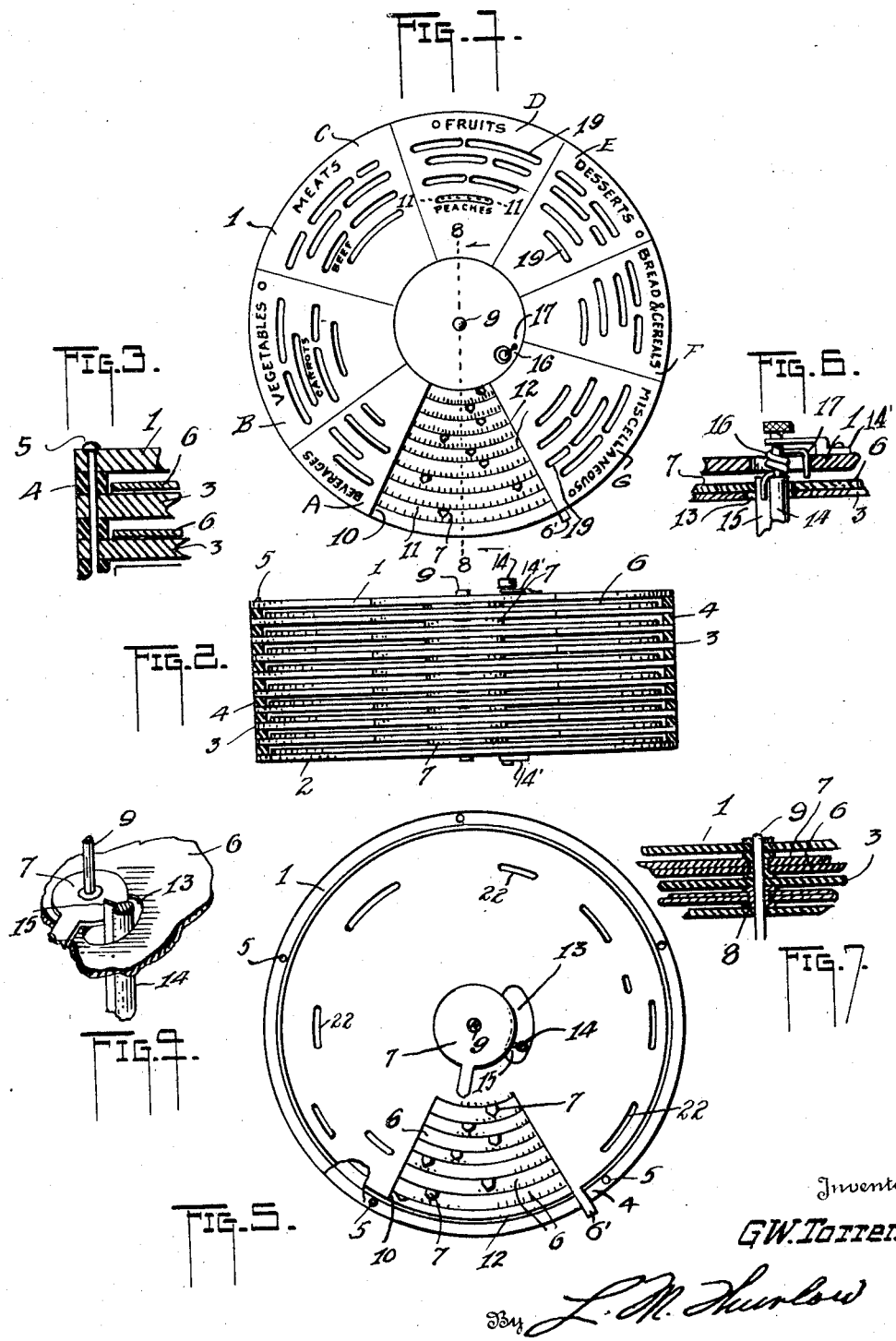

May 20, 1947.    G. W. TORRENCE    2,420,762
MEANS FOR ADDING VALUES
Filed July 1, 1944    2 Sheets-Sheet 2
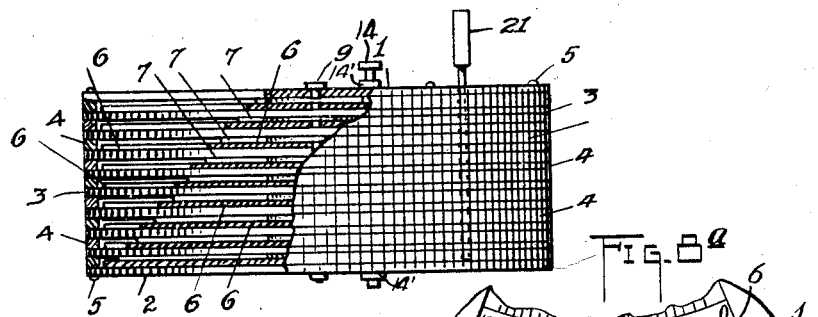
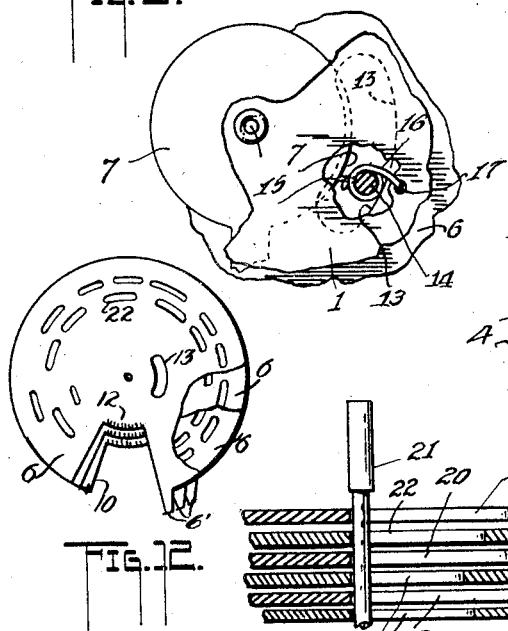
Inventor
G. W. Torrence,
By L. M. Thurlow
Attorney Patented May 20, 1947

2,420,762

UNITED STATES PATENT OFFICE 2,420,762

MEANS FOR ADDING VALUES

George W. Torrence, Peoria, Ill.

Application July 1, 1944, Serial No. 543,663

5 Claims. (Cl. 235—78)

This invention pertains to manually operated means for adding values.

More particularly the invention relates to a series of separate and independent members to be manually shifted, these representing different types of vitamins, each being provided with scale markings indicating the unit values of any vitamin with which it is identified, the movement of any one of the members being automatically terminated at a given position at an indicator, the several values shown at the several members thus moved designating the types and quantities by units of each vitamin entering into a desired whole.

Specifically, and as an object, the invention in this instance is to provide, in the main, a series of members, such as discs, arranged one above another and separately shiftable, each carrying scale markings to indicate values in a progressive order therealong as representing given types of vitamins, and of calories, for example, minerals or other factors, or such vitamins and calories and the like as are attributed to certain articles of food, each member at positions thereon representing different vitamins of the known series of vitamins.

Further, an object is to provide a series of slots in the several named members, and corresponding slots in a housing that carries and guides the members or discs in their shifting movements, the slots in the members and those in the housing lying in line so that by a lateral shifting movement of a shifting-pin inserted through corresponding slots movements may be imparted to any one or several of said members. Further, that by providing longer or shorter slots in the named members any certain member of the series may be moved a greater or less distance corresponding to the number of units of a certain prescribed vitamin registered at a pointer or indicator, the shifting movement of the named pin being limited by the spread of any given slot in the housing.

It is to be stated that while the device is particularly adapted to the above use it is also adaptable to other like purposes.

To the end that the invention may be fully understood, the accompanying drawings are provided forming parts hereof.

Figure 1 is a plan of the device of my invention somewhat enlarged;

Figure 2 is a front elevation of the same in part transverse section;

Figure 3 is an enlarged elevation in section of part of what is illustrated in Figure 2;

Figure 4 illustrates in perspective, and much enlarged, parts of the structure employed;

Figure 5 is a plan of the structure of Figure 1 but without the top portion.

Figure 6 is an elevation in part section of parts shown in Figure 4;

Figure 7 is a transverse section of certain members of Figure 2 much enlarged, showing structural features;

Figure 8 is an elevation in part section of parts illustrated in Figure 1 taken on line 8—8 of that figure;

Figure 8a is an enlarged plan of parts illustrated in Figure 5 showing scale numerals thereon.

Figure 9 is a plan, greatly enlarged, of certain parts shown in Figure 4;

Figure 10 illustrates in perspective certain portions, in part only, shown in Figure 8.

Figure 11 is an elevation much enlarged, and in transverse section, of some of the members appearing in Figures 1 and 8 as produced on line 11—11 of Figure 1, and Figure 12 is a plan of parts of three shiftable members shown in Figure 5, but produced on a smaller scale.

My device, as stated, is particularly adapted for use in determining the number of units of vitamins, calories and the like as aforesaid, in foods of different types, certain parts or members herein employed each corresponding to certain types of vitamins, for example, and so marked or scaled with respect to their use at a pointer or indicator, as to register the number of units, and value of the units as a whole, of a given vitamin in a given food.

In the drawings 1 and 2 denote, respectively, a top and bottom part or member, in the present instance, only, being represented each as a disc, both forming parts of a housing for the registering portions now to be made known.

Stationed between the two mentioned discs is a series of spaced discs 3, to be known herein as "spacers" which may be the same diameter as the latter, these being held in fixed spaced relation at their margins by rings or washers 4, a series of rivets 5 passing through all of the named parts serving to secure the whole in a complete and compact arrangement, the structure constituting a housing.

Below the top disc 1 and resting upon a spacer 3 is a member such as a disc 6 which, as with others of its kind, may be termed a computing disc, there being one of these discs 6 between each two spacers 3, the lowermost computing disc lying upon the bottom disc 2.

Attached centrally to each disc 6 upon its top side is a pointer or indicator 7, the two being held in connected but shiftable relation by a hollow rivet 8. So connected, a pointer is free to shift with respect to an associated disc, and yet friction between them will cause them to move together as will appear later.

A pin 9 extends centrally through all of the discs 1, 2 and 3 by extending through the several hollow rivets, and is suitably fixed with respect to the housing, thus forming a support about which the several discs 6 and their pointers 7 may rotate, the distance between the spacers 3 being such as to readily permit this action.

Parts of the top 1, as well as the several spacers 3, and the washers 4, are cut away or recessed at one side of the structure, as at 10, thus creating a space for exposing parts of the computing discs 6 and the pointers 7 for observation. It is to be here noted that the last named discs are each of a slightly different form. That is to say, the lowermost disc 6 is of full diameter at the recess, its periphery being inwardly spaced from the lowermost washer 4 sufficiently to permit free rotation. Each of other discs, or those lying above said lowermost disc is recessed by removing a segment thereof, the angular width of each of which is equal to, and conforms in appearance with the recess in said top plate 1. The several discs are progressively less in measurement from the lowest to the topmost within the recess, measured from their centers outwardly. This forms a stepped arrangement so that the margin of each next lower disc is exposed to view within said recess. Since this is true the pointers or indicators 7 are of varying lengths, i. e., each is of a length sufficient to extend toward the edge of its own disc to be visible at the latter as shown, the width of the recess 11 in each disc being coaxial in measurement with the spread of the recess 10 of the housing as intimated.

In the practical use of the device the discs 6 are shiftable from a starting position and are to be moved in either direction a distance equal only to the width of the said recess 10 of said housing. The extremes of movement will be understood by a study of Figure 10 where, preferably certain means limit the movement of the discs in either direction. For example, at the right of the recess 10 the terminals of the rings or washers 4 are cut away to space them inwardly between the spacers 3 providing recesses 4'.

Each disc 6, as shown in Figure 10 may have an extended ear 6' at its periphery, a side edge thereof being part of the wall at the notch 10. The recess 4' described receives an ear into it when the disc is moved fully toward the right, the said washer 4 forming an abutment therefor at the time the said ear is wholly within the said recess 4', this being the starting position for operation. At the same time, the said ear will abut the washer at the opposite side of the recess forming a limit for movement of a disc and its ear toward the left. It is observed that each disc 6 is provided with markings 12 at each recess. These indicate values of vitamin units progressively, and, of course, such markings radiate from the center of the structure, the said discs being marked, though not so shown, except in Figure 8a, to denote, severally, calcium, phosphorus, iron niacin, vitamin C, vitamin B², vitamin B¹ and so on, for example. The indicator 7 of a given disc is designed to extend to the marking or scale of that disc, as stated, so that in any adjustment of the latter given units of a given vitamin may be read.

Normally, the notches of the discs 6 lie wholly within the recess 10 as the position required at the time the device is to be placed in operation.

It has already been stated that the indicator and the disc carrying it may shift one with the other, also that they may move with respect to each other.

Friction between the two together with the hollow rivet connection insures that when a disc is shifted in a direction for computing, the pointer will move with it. For practical purposes in the normal operation of the device it is necessary at times that the indicator be held in a fixed position while the disc shifts with respect to it. That this may result an arcuate slot 13 is provided in each disc 6, described about the axis of disc rotation.

Extending through all the slots 13 and paralleling the named axis is a rock-shaft 14 mounted in the bearings 14' affixed to the upper and lower plates 1, 2. Said rock-shaft has a fin 15 extending therealong whose free edge may be sharp. This fin normally bears against the edges of all the rounded base portions of the indicators. As provided, the fin or blade 15 lies at one side of a line drawn through the axis of rotation of the shaft and indicator, and thereby the said indicator while free to swing in one direction is prevented moving in the opposite direction, the fin acting as a one way brake therefor. In order that any one disc 6 may rotate independently of the fin 15 it will be noted in Figure 9, for example, that the circular edge of the indicator-base overlies the slot 13 of the disc and that its edge, therefore, is farther from the center of disc rotation than is the edge of the disc at said slot. Thus the fin never interferes with the disc, the latter always being free to turn. That the fin shall always have contact with the indicator a spring 16, for example, is coiled around the said shaft 14, one end being bent over the end of the fin 15 while its other end may engage in a hole 17 in the top 1.

The said top 1 is preferably separated into zones by radiating lines substantially as shown, each zone being identified by the name of an article of food, or rather, a general designation of a class of food such, for example, as fruit, vegetables, drinks, meat, and the like, said zones being identified severally by A, B, C, D, E, F, G. Within each zone are slots 19 opening through said top, these being of various lengths and lying in concentric circles described from the axis of disc rotation. At each slot in the "fruit" zone, for example, the name of a given type of fruit is provided. In the "vegetable" zone the names of various types of that class are placed, and so on throughout all of the designated zones. Similar slots 20 are provided in the spacers 3 below the slots 19 in the same relative positions and corresponding in extent thereto. By this means a shifting-pin 21 inserted through any one slot in the said top will pass through all of the spacers, so that when said pin is held in a vertical position and given a lateral shift by the operator it will have the same degree or extent of movement throughout all of said spacers.

Each disc 6 is also provided with slots 22 certain of them lying in line with and corresponding with certain of those just described. In this case, however, a slot may be of the same length or it may be of less extent than a correspondingly placed slot 19 in the top 1 and the slots 20 in the spacers 3. At any rate the shifting-pin 21 will pass through all of a given series of slots and a certain extent of movement will be imparted to all discs 6 in greater or less degree depending on the length of the slot in those discs. Figure 11 illustrates what may be a certain relation of the slots 22 as to their lengths as compared to the spread of the slots 19 in the top 1. In this figure but three of the discs 6 are shown as an example, the spacers 3 and discs 6 in that figure being shown separated merely in order to more clearly show the relation of the various slots.

Any one of the slots 22 of the discs 6 immediately below the top 1 may have the same spread as the slot 19 of said top as stated. In Figure 11 the slot 22 in the disc 6 below the top is shorter than the slot 19 while that in the second disc 6 below is still less in spread or extent, all depending upon whether certain foods contain more or less vitamin values. Again, in said Figure 11, the slot 22 in the third or lowest disc 6 shown has a different spread from the one above it. Throughout the series of discs, then, the slots may vary in any or all of the discs 6.

Figure 1 shows a series of seven zones, each representing a different food, while the discs to be operated are greater in number. However, any number of zones may be employed without respect to the number of discs. Enough discs are used, each for a given vitamin, for any or all known vitamins, whereas the food zones may be many or few, depending upon the various types of names of food it may be the desire to indicate as having vitamin content. There is, therefore, no direct relation between the number of food zones and the number of discs. In this connection each disc represents one single type of vitamin, or other commodity, only. For example, the topmost disc may represent one type, the next below another type, and the next still another type, and so on throughout the list. Each disc has but one group of slots 22. That is to say, all of the slots in a disc, whatever their positions in the latter, are as a single group. This being true, each disc when shifted serves to count vitamins only with which that disc is identified when operated by the pin 21. A single shift of the pin will simultaneously account for several types of the vitamins in moving the discs corresponding to such several types.

For operation of the device now to be described, all of the discs, several of which are shown in Figure 11, must first be in their normal or starting positions as there shown. By inserting the pin 21 through a slot 19 in the top 1 it will pass through all of the slots in the discs that lie immediately in line with said slot 19. In a lateral movement of said pin any one or several of the discs may be rotated more or less, depending upon the spread of the disc slots, the total movement being controlled by the spread of the named slot 19. A slot in a disc engaged by the pin may have a spread but slightly less than the slot 19. In such an event the pin will traverse the disc-slot for the greater part of its spread without result as to disc movement. However near the end of its travel the pin will abut the disc at the limit of the slot and rotate said disc but a short distance, or until said pin meets the limit of spread of said slot 19. Again, a slot in a disc may have but little spread and for that reason the pin will, in moving therealong, quickly abut that disc and impart a considerable travel thereto before being stopped within the slot 19. The slots in the various discs are proportioned in spread according to the units of vitamins attributed to the given foods and as found therein. This explains the reason for the various slot-spreads. Any group movement of discs results in counting the several types of vitamins represented by individual discs, as attributed to a given food.

Each time the pin 21 has shifted the discs for a counting of vitamins it is shifted back to the normal or starting positions of the discs for succeeding like operations, the pointers at the scales retaining the positions to which they have been carried, since held by the fin 15. The continued use of the pin through the several food zones finally gives the total units of vitamins in those foods. When this has been done all of the discs may be placed at their starting positions, together with the indicators which are released by disengagement of the said fin 15 therefrom.

Let it be supposed that a dinner has been served, and it is the desire to determine the type of vitamins, and units of each, carried by the food thus served. In such event, the pin 21 is inserted in a slot 19 in the meat zone, for example, and if beef has been a portion of the serving the slot corresponding to that designation is the one selected. The lateral movement of the pin will shift the disc or discs corresponding to the vitamins attributed to the meat item. Following this shift the discs are returned to their initial positions, whereupon a slot may be chosen in the vegetable zone, for example, and if carrots were a part of the diet the pin is inserted in the proper slot and the shifting movements are repeated. This procedure is followed in respect to disc movement, and, in succession, all of the other types of food are likewise brought under investigation.

Having thus accounted for all of the vitamins, and remembering that each disc has a vitamin designation, the totals of each vitamin can at once be read at the several pointers.

Other ways of accomplishing the object herein may be used since I do not wish to confine myself necessarily to exact means described and shown. For instance, while the term disc has been applied to the members, 1, 3 and 6 it is understood that other forms of shiftable members, not necessarily rotatable, can be as readily employed with like results, and as coming under the terms of the appended claims.

I claim:

1. In a device of the nature described, a housing part of which has a series of slots therein severally having designations thereat, by data, certain vitamin and mineral-containing foods, a series of flat members mounted in the housing and paralleling the slotted part adapted to be shifted in opposite directions in their own planes and having slots therein in line with and each paralleling one of the slots in the housing for receiving therethrough a shifting-pin inserted through the housing slot, the said members each corresponding to a given vitamin or mineral in a food, and said slots in the members severally varying in spread relatively in a direction paralleling the lengthwise spread of said housing slot, a scale for each member to shift therewith including numerals arranged to have increasing value in one direction therealong for denoting increasingly higher and higher counts of units of vitamins, a mounted shiftable indicator at each said scale, any said indicator being moved in a shift in one direction of a member corresponding thereto toward the highest reading end of the scale, and means to prevent movement of the indicator from the position to which it may have been moved when the member corresponding thereto is shifted in an opposite direction, the movement of the several members being limited by the extent of spread of the slot in the housing corresponding to any one member in the travel of the said shifting-pin.

2. The invention as defined in claim 1 wherein the scales for the several shiftable members are directly carried by said members by being stationed thereon.

3. In a device of the nature described, a housing part of which has a series of slots of arcuate form therein severally having designated thereat, by data, certain vitamin and mineral containing foods, a series of discs mounted in the housing paralleling the slotted part adapted to be shifted in opposite directions in their own planes, a central mounting on which the discs turn, and around which the slots in the housing are arranged, said discs having slots therein in line with any one of the first named slots, the slots in the discs varying in spread, relatively, in a direction paralleling the lengthwise spread of the corresponding slot in the housing, a scale displayed on each disc including numerals arranged to have increasing value in one direction along the scale for denoting higher and higher counts of vitamin units, an indicator at each scale mounted at the axis of rotation of the discs, each indicator being shifted in and by a shift in one direction of a disc corresponding thereto toward the highest reading of the scale, and means to prevent movement of the indicator from a position to which it may have been moved when the disc corresponding thereto is shifted in an opposite direction, the movement of the several discs in either direction being limited by the slot in the housing corresponding to those discs by the travel of a shifting-pin inserted in and through the last named slot and the disc slots.

4. In a device of the nature described, a housing part of which has a series of slots of arcuate form therein severally having designated thereat certain vitamin and mineral containing foods, a series of discs mounted in the housing paralleling the slotted part adapted to be shifted in opposite directions in their own planes, a central mounting on which the discs turn, and around which the slots in the housing are arranged, parts of the discs being exposed at their peripheries and being progressively less in diameter at said parts toward the center of rotation whereby said peripheries may be seen, and said discs having slots therein in line with one of the housing slots for receiving a shifting-pin introduced through the latter, said discs each corresponding to a given vitamin or mineral, their slots severally varying in spread, relatively, in a direction paralleling lengthwise spread of the housing slot, a scale denoted on each disc at its exposed periphery including numerals arranged to have increasing values in one direction therealong for denoting higher and higher counts of vitamin units, and a visible indicator at each scale mounted at the axis of rotation of the discs, each indicator being shifted in and by a shift in one direction of a disc corresponding thereto toward the highest reading end of the scale, and means to prevent movement of the indicator from a position to which it may have been moved when the disc corresponding thereto is shifted in an opposite direction, the movement of the several discs in either direction being limited by the spread of the housing slot in the travel of said shifting-pin.

5. The invention as defined by claim 4 wherein the means to prevent movement of the indicator comprises a rock-shaft having a fin for gripping the indicator, and which is elastically held against said indicator.

GEORGE W. TORRENCE.

REFERENCES CITED

The following references are of record in the file of this patent:

UNITED STATES PATENTS

| Number | Name | Date |
| --- | --- | --- |
| 780,853 | Anderson | Jan. 24, 1905 |
| 1,694,877 | Hutchings | Dec. 11, 1928 |

FOREIGN PATENTS

| Number | Country | Date |
| --- | --- | --- |
| 572,639 | France | June 10, 1924 |